(12) United States Patent
Chapman et al.

(10) Patent No.: US 12,550,270 B2
(45) Date of Patent: Feb. 10, 2026

(54) FACE PLATE FOR CABLE TAP UNIT

(71) Applicant: TECHNETIX B.V., Veenendaal (NL)

(72) Inventors: Paul Chapman, West Sussex (GB); Gareth Shelley, West Sussex (GB)

(73) Assignee: TECHNETIX B.V., Veenendaal (NL)

( * ) Notice: Subject to any disclaimer, the term of this patent is extended or adjusted under 35 U.S.C. 154(b) by 292 days.

(21) Appl. No.: 18/379,210

(22) Filed: Oct. 12, 2023

(65) Prior Publication Data
US 2024/0130054 A1    Apr. 18, 2024

(30) Foreign Application Priority Data
Oct. 13, 2022  (GB) ..................................... 2215120

(51) Int. Cl.
| | |
|---|---|
| *H05K 5/00* | (2025.01) |
| *H01R 9/05* | (2006.01) |
| *H01R 25/00* | (2006.01) |
| *H04H 20/78* | (2008.01) |

(52) U.S. Cl.
CPC ......... *H05K 5/0065* (2013.01); *H01R 9/0509* (2013.01); *H01R 25/003* (2013.01); *H04H 20/78* (2013.01)

(58) Field of Classification Search
CPC .. H05K 5/0065; H01R 9/0509; H01R 25/003; H04H 20/78
USPC .................................................. 439/225, 578
See application file for complete search history.

(56) References Cited

U.S. PATENT DOCUMENTS

| | | | | |
|---|---|---|---|---|
| 4,270,214 | A | * | 5/1981 | Davis ................ H04L 12/40032 455/80 |
| 5,756,935 | A | * | 5/1998 | Balanovsky ......... H01R 24/547 200/51.09 |
| 5,909,154 | A | * | 6/1999 | Brown ................... H04N 7/104 333/100 |
| 5,945,634 | A | * | 8/1999 | Shimirak ............... H01R 24/42 174/92 |
| 6,024,604 | A | * | 2/2000 | Chilton .................. H04N 7/104 174/559 |
| 6,033,101 | A | | 3/2000 | Reddick et al. |
| 6,066,801 | A | | 5/2000 | Kodaira et al. |
| 6,129,597 | A | * | 10/2000 | Gresko .................. H01R 24/52 439/583 |
| 6,133,939 | A | * | 10/2000 | Gresko .................. H04N 7/104 725/127 |
| 6,230,391 | B1 | * | 5/2001 | Chilton ................ H01R 24/547 29/750 |

(Continued)

*Primary Examiner* — Tulsidas C Patel
*Assistant Examiner* — Thomas K Quigley
(74) *Attorney, Agent, or Firm* — SZDC Law PC

(57) ABSTRACT

There is provided a face plate (36) for a cable tap (10) comprising a printed circuit board (PCB) (40) and first and second electrically conductive interface elements (32, 32') in contact with the PCB (40), wherein the first interface element (32) has a first impedance and is configured to engage with an input connector (24) within a back box (12) and the second interface element (32') has a second impedance and is configured to engage with an output connector (24') within the back box (12). The interface elements are elongate pins, typically with a length in the range 2 to 25 mm. A support structure (42) disposed around each interface element. Part of the support structure (42) forms a boss (64, 64') mountable on electrical switches associated with a power bar (70) within a back box.

8 Claims, 4 Drawing Sheets

(56) References Cited

U.S. PATENT DOCUMENTS

| | | | |
|---|---|---|---|
| 6,261,125 B1* | 7/2001 | Yeh | H04N 7/104 |
| | | | 348/E7.053 |
| 6,292,371 B1* | 9/2001 | Toner, Jr. | H01R 25/006 |
| | | | 361/752 |
| 6,560,778 B1 | 5/2003 | Hasegawa | |
| 6,570,465 B2* | 5/2003 | Tang | H01R 24/547 |
| | | | 333/112 |
| 6,580,336 B1 | 6/2003 | Gerszberg et al. | |
| 6,593,830 B2* | 7/2003 | Wu | H01R 24/46 |
| | | | 725/127 |
| 7,086,078 B1* | 8/2006 | Gresko | H04N 7/104 |
| | | | 725/127 |
| 7,807,935 B2* | 10/2010 | Tang | H01R 24/46 |
| | | | 333/100 |
| 9,647,851 B2* | 5/2017 | Newby | H04N 7/104 |
| 9,661,263 B2* | 5/2017 | Chang | H04N 7/104 |
| 9,923,319 B2* | 3/2018 | Ariesen | H04N 7/104 |
| 10,312,607 B2* | 6/2019 | Wilson | H01R 12/515 |
| 10,637,121 B2* | 4/2020 | Palawinna | H01P 5/00 |
| 10,784,597 B2* | 9/2020 | Jones | H01R 43/26 |
| 10,958,870 B2* | 3/2021 | Jones | H04N 7/106 |
| 11,522,324 B2* | 12/2022 | Lin | H01R 13/502 |
| 12,388,223 B2* | 8/2025 | Tang | H01R 13/6658 |
| 2002/0067222 A1* | 6/2002 | Tang | H01R 24/547 |
| | | | 333/109 |
| 2010/0095344 A1* | 4/2010 | Newby | H04N 21/6168 |
| | | | 725/125 |
| 2010/0277253 A1 | 11/2010 | Mui | |
| 2012/0278850 A1 | 11/2012 | Lee et al. | |
| 2015/0236460 A1* | 8/2015 | Ariesen | H01R 25/003 |
| | | | 725/144 |
| 2021/0351524 A1 | 11/2021 | Chapman et al. | |

\* cited by examiner

FACE PLATE FOR CABLE TAP UNIT

This application is claims priority to United Kingdom Patent Application No. GB 2215120.3, filed on Oct. 13, 2022, which is incorporated by reference for all purposes as if fully set forth herein.

FIELD OF THE INVENTION

This invention relates to a face plate used in a cable tap unit, and in particular outdoor cable tap units.

BACKGROUND TO THE INVENTION

In CATV networks, tap distribution products are connected in cascade to split the signal to individual homes as required by the network architecture. These products have been long standing in the network and have been installed since the 1980s. Each tap unit consists of a back box configured to remain fixed in the network and a removeable face plate electrically and physically connected to the back box and which can be removed from the back box and replaced for network adjustment and upgrade.

CATV networks operate with a 75 Ohm characteristic impedance. The first cable tap units were only required to work up to signal frequencies of 470 MHz or 860 MHz so impedance mismatch between input and output connectors within the back box did not have a detrimental effect on the performance. However current networks operate at much higher frequencies and the circuit design of face plates has been modified to extend the bandwidth up to 1.2 GHz, whilst still keeping the original back boxes within the network. This is reaching an upper frequency limit primarily due to impedance mismatches between constituents of the cable tap.

SUMMARY OF THE INVENTION

In accordance with the invention, there is provided a face plate for a cable tap comprising a printed circuit board (PCB) and first and second electrically conductive interface elements in contact with the PCB, wherein the first interface element has a first impedance and is configured to engage with an input connector within a back box of a cable tap and the second interface element has a second impedance and is configured to engage with an output connector within a back box. The interface elements enable differences in impedance between constituents of the cable tap to be compensated for, ensuring much reduced signal losses at high frequencies above 1.2 GHz. Thus the impedance of the input connector when combined with the impedance of the first interface element can be selected to match the impedance of the PCB, and similarly the impedance of the output connector when combined with the impedance of the second interface element can match the impedance of the PCB, with in this case the impedance of each interface element being identical if the impedances of the connectors within the back box are identical.

The first impedance may be different to the second impedance, thereby to offset differences in impedance of input and output connectors within a back box forming part of a cable tap. By configuring the interface elements to have different impedances, the impedance of the input connector when combined with the first interface element matches the impedance of the output connector when combined with the second interface element. Thus the mismatch of impedance between input and output connectors within a back box is compensated for.

Preferably the interface elements are elongate pins, typically formed from metal, and desirably have a length in the range 2 to 25 mm.

The elongate pins may each comprise at least three sections, the first section being a PCB mounting section, the second section being a central impedance matching section and the third section being a back box connection pin or socket.

The impedance matching section may comprise one or more regions of varying diameter, for example having a conical region or a curved region.

A support structure is preferably disposed around each interface element, and a separate support structure may be provided for each interface element.

Preferably the support structure is secured to the PCB.

Part of the support structure may form a boss mountable on electrical switches associated with a power bar within a back box of a cable tap. Thus when the face plate is removed, the boss is removed from the switches which are then triggered to maintain power through the back box, rather than power routing through the PCB.

The invention will now be described, by way of example, with reference to the accompanying drawings in which.

Figures 6A, 6B, 6C:
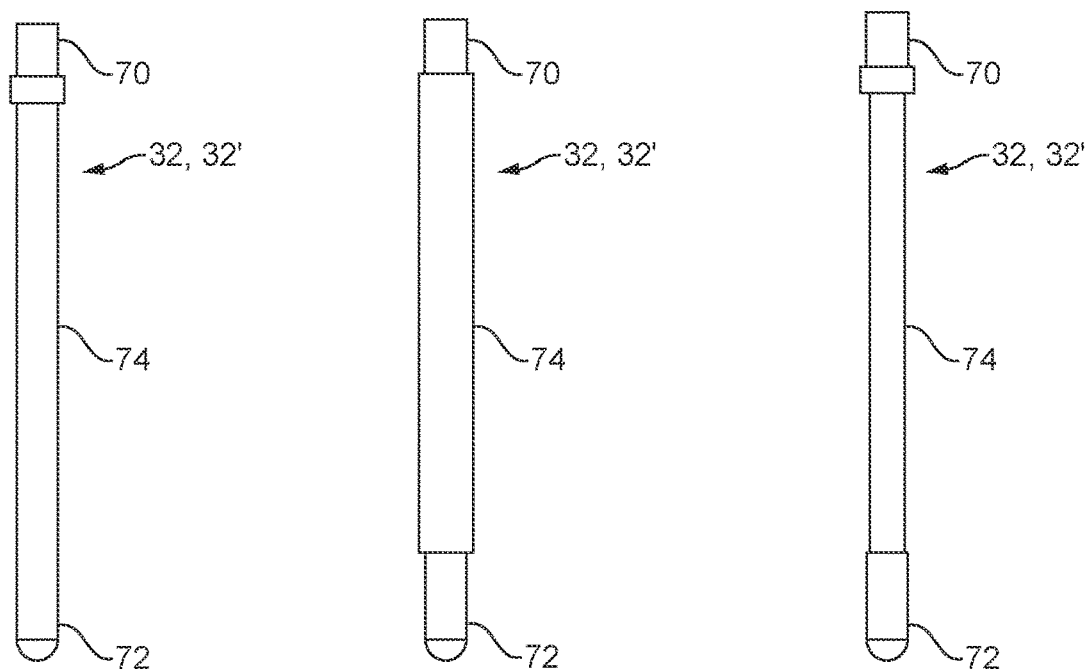

FIGS. 6A, 6B, and 6C show alternative interface elements; and

Figure 7:
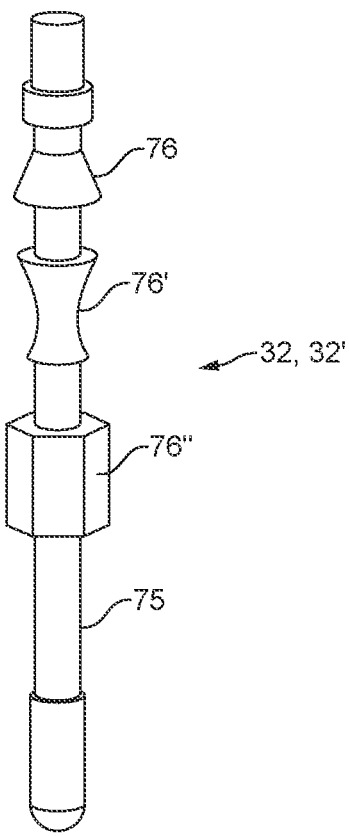

FIG. 7 shows a further alternative interface element.

DESCRIPTION

Figure 1:
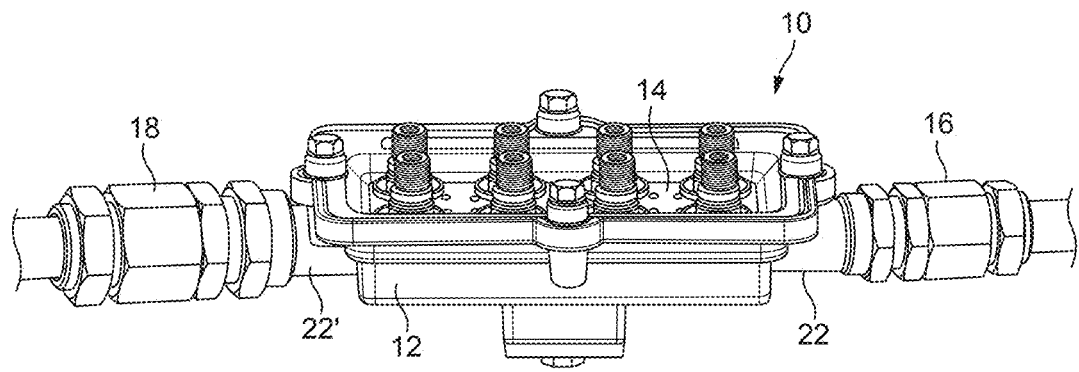
FIG. 1 shows a perspective view of a prior art cable tap unit.

FIG. 1 shows a prior art cable tap 10 comprising back box 12 and face plate 14. Back box 12 is positioned within a cable network, with a coaxial network connection 16, 18 secured to cable ports 22, 22' so as to supply electricity to internal back box input and output connectors. When a face plate with a plurality of tap ports is attached to back box 12, electrical communication is established between the internal back box connectors and tap ports of the face plate by way of a PCB forming part of the face plate. For a prior art tap unit, impedance mismatches result in loss characteristics worse than 10 dB for a signal frequency of 1.8 GHz for a single connected port. This leads to too large a loss to enable tap unit 10 to operate effectively within the network at frequencies above 1.2 GHz.

Figure 2:
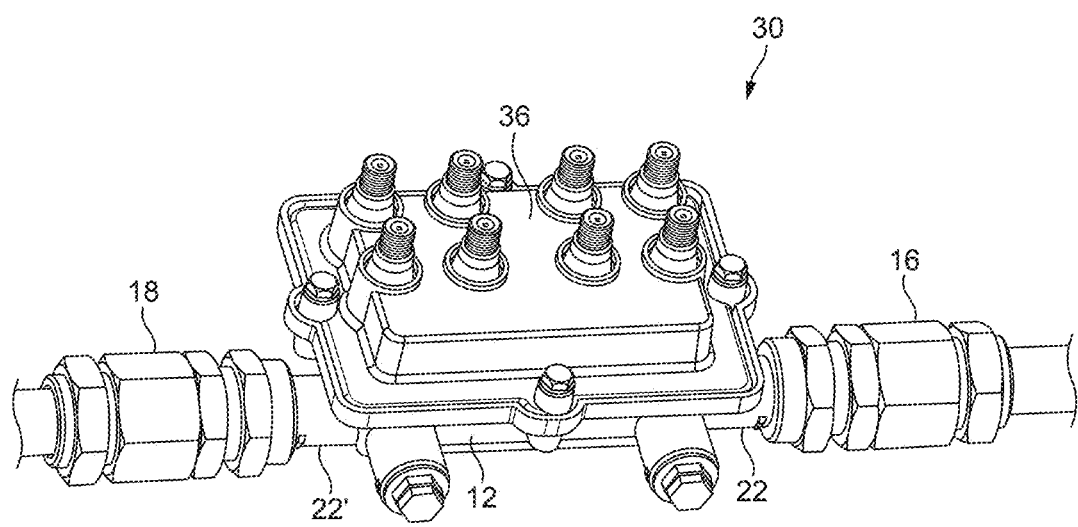
FIG. 2 shows a perspective view of a cable tap unit incorporating a face plate in accordance with the present invention.
Figure 3:
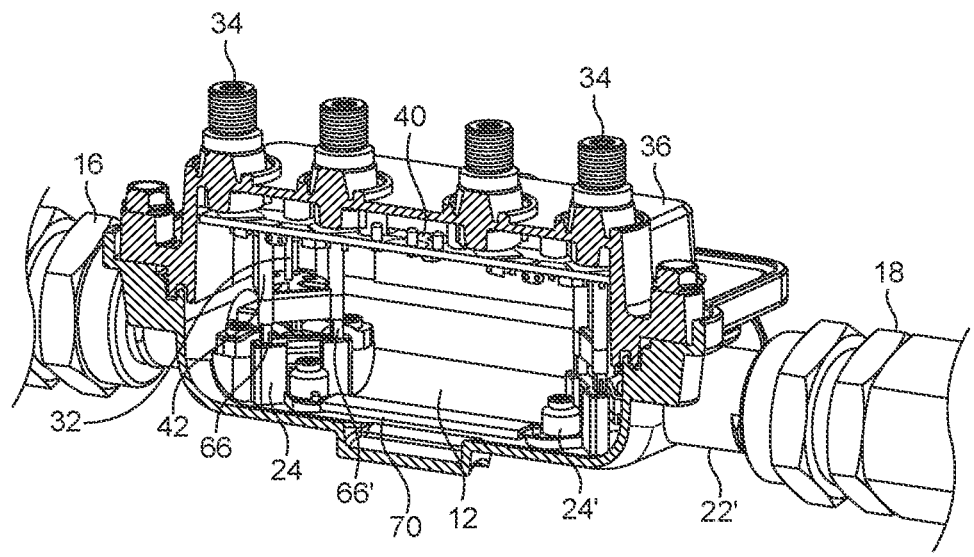
FIG. 3 shows a cut-away view through part of the cable tap unit of FIG. 2.
Figure 5:
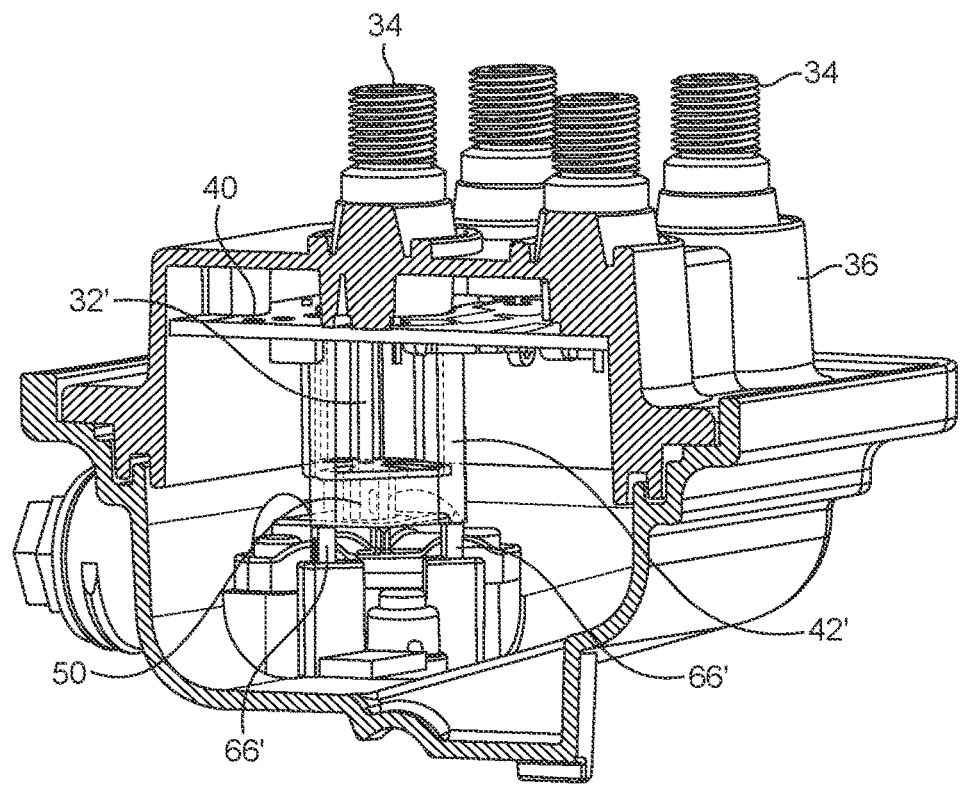
FIG. 5 shows a second cut-away view through part of the cable tap unit of FIG. 2.

FIGS. 2, 3 and 5 show a tap unit 30 in which internal interface elements 32, 32' connected to face plate 36 are disposed between internal back box input connector 24 and output connector 24' and tap ports 34 of face plate 36. Typically such a face plate has an increased height compared to a standard face plate so as to allow sufficient room for placement of interface elements 32, 32'.

FIG. 3 shows interface element 32 depending from PCB 40 of face plate 36 so as to electrically connect input connector 24 to PCB 40. Interface element 32 is a coaxial element in the form of an elongate electrically conductive pin and is held in position by a support structure 42 fixed to PCB 40. Structure 42 is constructed from material with a low dielectric constant so as to have minimal effect on the impedance of the interface element 32, and is typically made from plastics material with a low dielectric constant so as to minimise capacitive effect around interface element 32. Support structure 42 holds interface element 32 in place and assists to guide one end of interface element 32 into input connector 24 when face plate 36 is connected to back box 12.

Whilst various types of support structure are possible, for example a single support structure supporting both interface elements 32, 32' or separate support structures for each element 32, 32'. Typically interface element 32 extends through at least a portion of the support structure so as to be secured against lateral movement.

For the embodiment shown in FIG. 3, one interface element and an associated support structure mounts on each connector 24, 24', there thus being two respective pairs of interface element and support structure, with second interface element 32' shown in FIG. 5.

Figure 4:
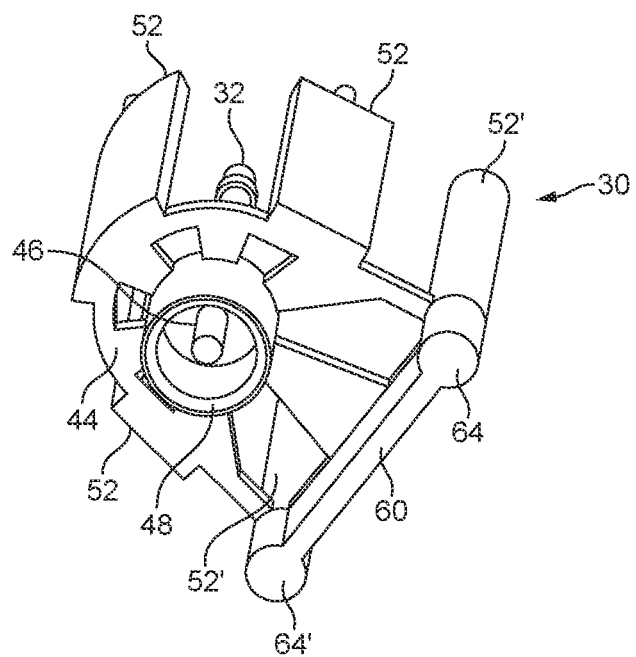
FIG. 4 shows a perspective view of a support structure used in association with such a face plate.

Support structure 42 is formed as a skeleton structure so as to reduce the amount of material required to form structure 42 whilst maintaining structural integrity. One embodiment of structure 42 is shown in detail in FIG. 4 where structure 42 comprises a U-shaped base 44 formed with an aperture 46 to receive interface element 32 and allow it to be positioned in physical and electrical contact with connector 24 and PCB 40. Collar 48 surrounds aperture 46, extending downwards from base 44 so as to be locatable in or over connector ring 50 of connector 24 and so assist with guiding interface element 32 into physical and electrical contact with connector 24.

Base 44 is formed with five elongate elements 52, 52' which in use extend between connector 24 to PCB 40. Bar 60 extends between two cylindrical elongate elements 52' and is connected to base 44. Bar 60 extends downwards from base 44 so as to provide two bosses 64, 64' which sit on and depress switch elements 66, 66' of connector 24. When face plate 36 is removed from back box 12, switch elements 66, 66' are released to maintain current flow through power bar 70 rather than through PCB 40 and face plate 34.

The impedances of interface elements 32, 32' are selected so that when combined with the impedances of connectors 24, 24', any impedance mismatch between constituents of the cable tap is compensated for.

Where impedance mismatch occurs due to connectors 24, 24' within back box 12, the impedance of input connector 24 is adjusted to improve characteristics to the desired network impedance when combined with first interface element 32 and PCB 40. Similarly the impedance of output connector 24' is adjusted to improve characteristics to the desired network impedance when combined with second interface element 32' and PCB 40, in this case the impedance of each interface element is identical if the impedances of the connectors within the back box are identical.

Where there is an impedance mismatch between input and output connectors 24, 24' within back box 12, which mismatch may be in addition to or instead of an impedance mismatch with PCB 40, interface elements 32, 32' are configured to have different impedances to ensure the impedance of input connector 24 when combined with interface element 32 matches the impedance of output connector 24' when combined with interface element 32'. Thus the mismatch of impedance between input and output connectors 24, 24' within back box 12 is compensated for.

Interface elements 32 and 32' are generally formed as elongate pins, typically 5 mm to 25 mm in length, three examples of which are shown in FIGS. 6A, 6B, and 6C. Each pin has a common mounting section 70 for securing to PCB 40 and a common connection portion 72 to engage with connectors 24, 24' which can be formed as a pin end or socket end depending on the type of back box connector. Central section 74 is formed with different diameters depending on the impedance required for the pin.

Depending on the capacitance of the back box connector, the shape and dimensions of each interface element are modified as needed with different diameter and/or length matching section 75 as shown in FIG. 7. If desired, one or more wider and/or thinner sections can be formed with either straight or curved sides of varying or similar lengths, see for example sections 76, 76', 76".

A face plate with such interface elements 32, 32' allows for impedance mismatch between constituents of a CATV tap to be compensated for. Thus tap units, and in particular outdoor tap units, can easily be modified by replacing their existing face plates with modified face plate 36, so enabling the tap units to have improved operation at frequencies above 1.2 GHz, and typically up to frequencies of 1.8 GHz and beyond.

The invention claimed is:

1. A face plate for a cable tap comprising a printed circuit board (PCB) and first and second electrically conductive interface elements in contact with the PCB, wherein the first interface element has a first impedance and is configured to engage with an input connector within a back box and the second interface element has a second impedance and is configured to engage with an output connector within a back box,
wherein the interface elements are elongate pins, and
wherein the elongate pins each comprise at least three sections, the first section being a PCB mounting section, the second section being a central impedance matching section, and the third section being a back box connection pin or socket.

2. A face plate according to claim 1, wherein the first impedance is different to the second impedance.

3. A face plate according to claim 1, wherein the impedance matching section comprising one or more regions of varying diameter.

4. A face plate according to claim 1, further comprising a support structure disposed around each interface element.

5. A face plate according to claim 4, wherein a separate support structure is provided for each interface element.

6. A face plate according to claim 4, wherein the support structure is secured to the PCB.

7. A face plate according to claim 4, wherein part of the support structure forms a boss mountable on electrical switches associated with a power bar within a back box.

8. A face plate according to claim 1, wherein the elongate pins have a length in the range 2 to 25 mm.

* * * * *